(No Model.) 3 Sheets—Sheet 1.

H. A. ALDEN & J. E. KIRK.
HORSE HAY RAKE.

No. 436,165. Patented Sept. 9, 1890.

Witnesses
W. Rossiter
Fredk. H. Miles

Inventors
Horace A. Alden
John E. Kirk
By Penn & Julin
Attys.

(No Model.) 3 Sheets—Sheet 2.
H. A. ALDEN & J. E. KIRK.
HORSE HAY RAKE.
No. 436,165. Patented Sept. 9, 1890.
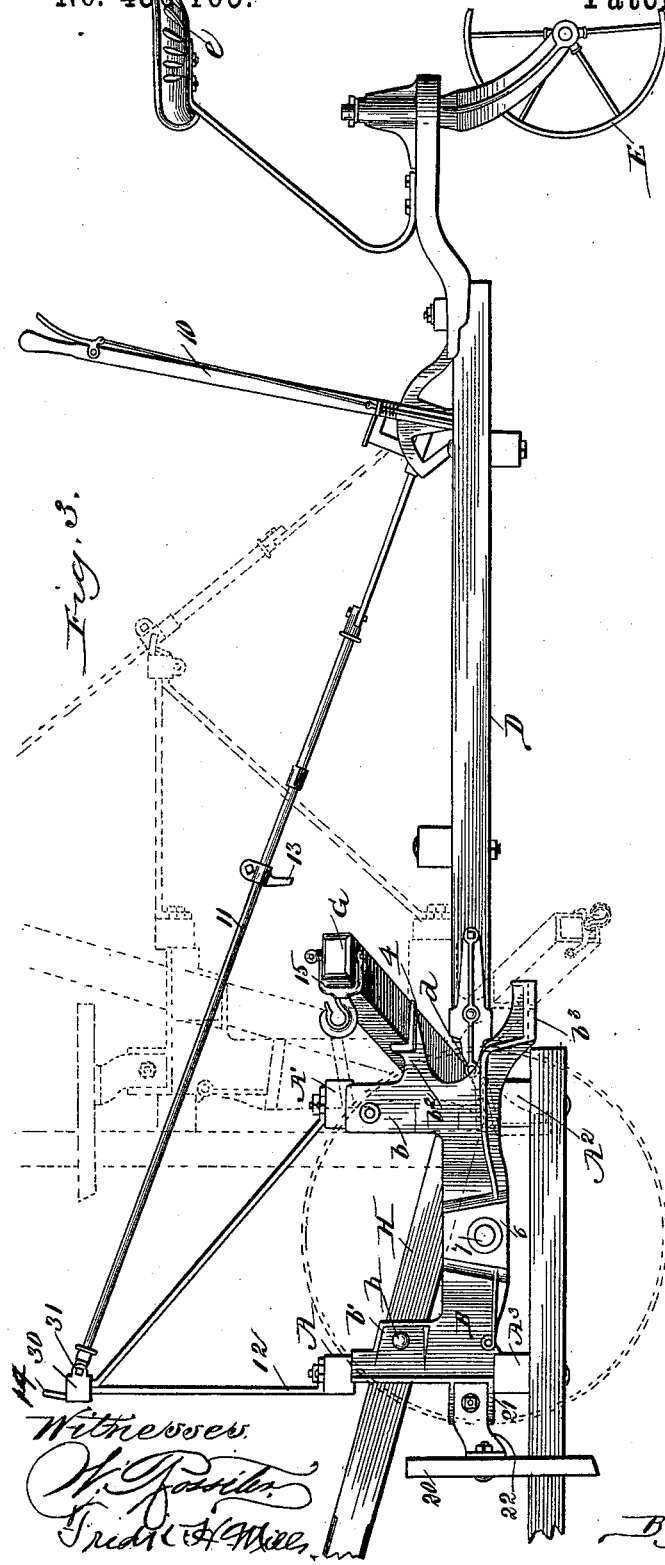
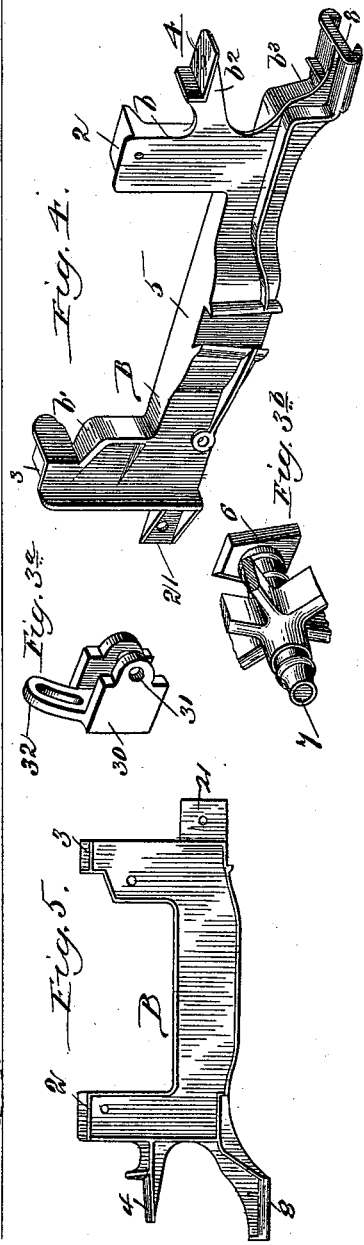
Witnesses.
Inventors.
Horace A. Alden
John E. Kirk (No Model.) 3 Sheets—Sheet 3.
H. A. ALDEN & J. E. KIRK.
HORSE HAY RAKE.
No. 436,165. Patented Sept. 9, 1890.
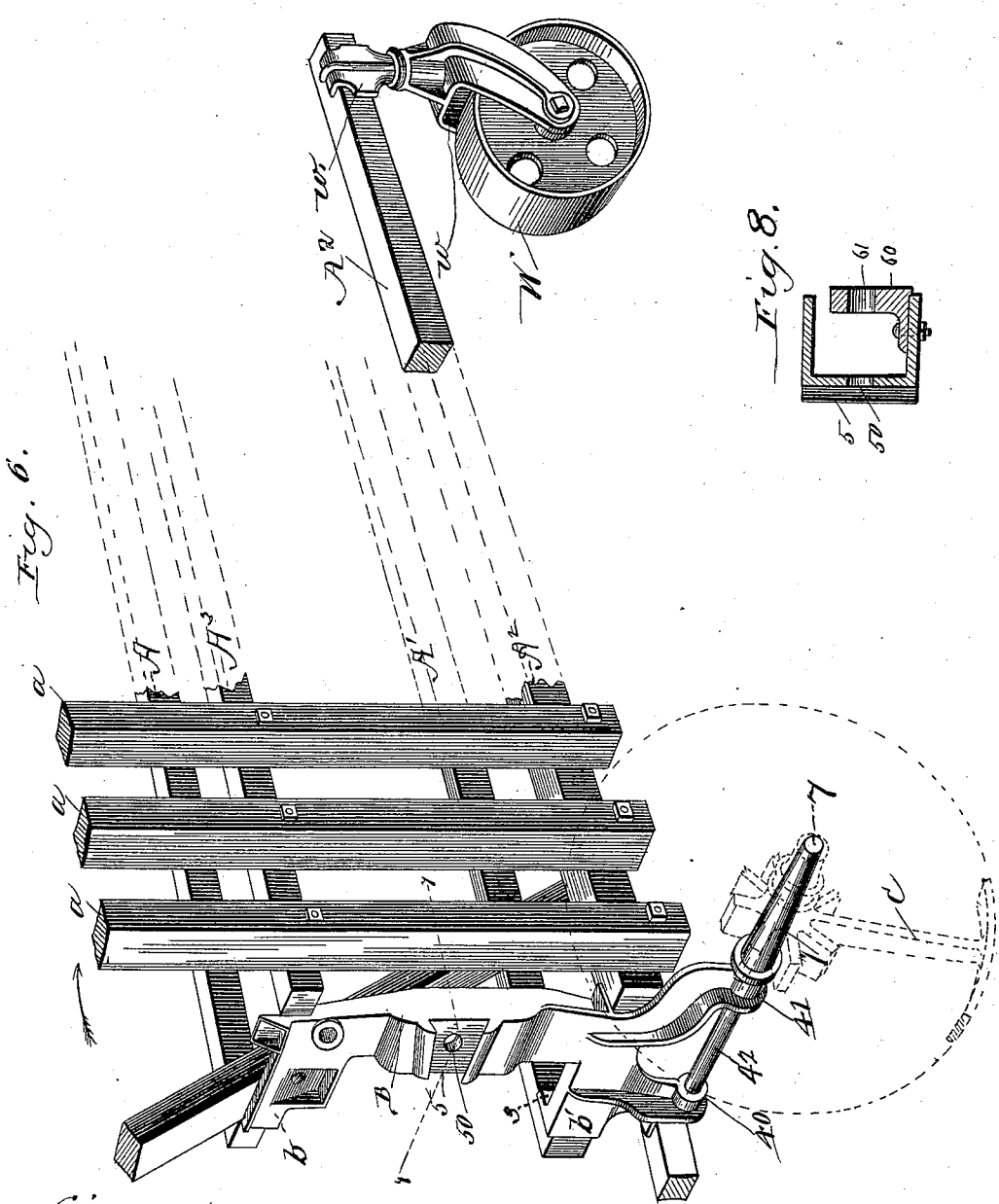

UNITED STATES PATENT OFFICE.

HORACE A. ALDEN AND JOHN E. KIRK, OF PEORIA, ILLINOIS, ASSIGNORS TO THE ACME HAY HARVESTER COMPANY, OF SAME PLACE.

HORSE HAY-RAKE.

SPECIFICATION forming part of Letters Patent No. 436,165, dated September 9, 1890.

Application filed June 10, 1889. Serial No. 313,743. (No model.)

*To all whom it may concern:*

Be it known that we, HORACE A. ALDEN and JOHN E. KIRK, citizens of the United States, residing at Peoria, in the county of Peoria, State of Illinois, have invented certain new and useful Improvements in Horse Hay-Rakes, of which we do declare the following to be a full, clear, and exact description, reference being had to the accompanying drawings, forming part of this specification.

Our present invention has relation more particularly to that class of horse hay-rakes in which long gathering-teeth project in front of a rake-head that is supported upon suitable carrying-wheels or supports. Rakes of this class (one example of which is shown in Letters Patent No. 355,674, granted to us January 11, 1887) are commonly known as "sweep-rakes" or "drag-rakes," and are usually from twelve to twenty feet in breadth. Owing to the great breadth of these rakes, it has been found very difficult to transport them from point to point—as, for example, through ordinary farm-gates, along ordinary highways, or through corn-fields, meadows, or the like—and this objection has proved so serious in practice as to prevent the adoption of the rakes in many instances.

The main object of our present invention is to so construct these sweep-rakes or drag-rakes that they may be readily moved endwise from point to point when not in use without taking up the great amount of room that is necessary when the rake is moved in the same position in which it is used.

To this end our invention consists, primarily, in providing the rake with means whereby the gathering-teeth can be turned to an approximately vertical position and can be there held, and in providing the rake with wheels arranged to rotate at right angles to the length of the rake-teeth, so that when it is desired to move the rake from point to point the horse at one end of the rake can readily pull the rake endwise.

Our invention also consists in the various novel features of construction and combination of parts hereinafter described, illustrated in the accompanying drawings, and particularly pointed out in the claims at the end of this specification.

Figure 1:
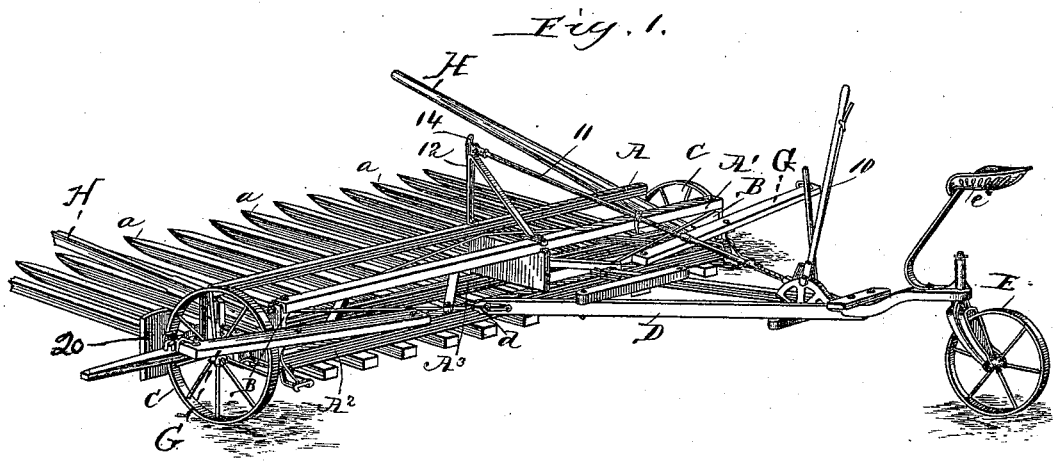
Figure 2:
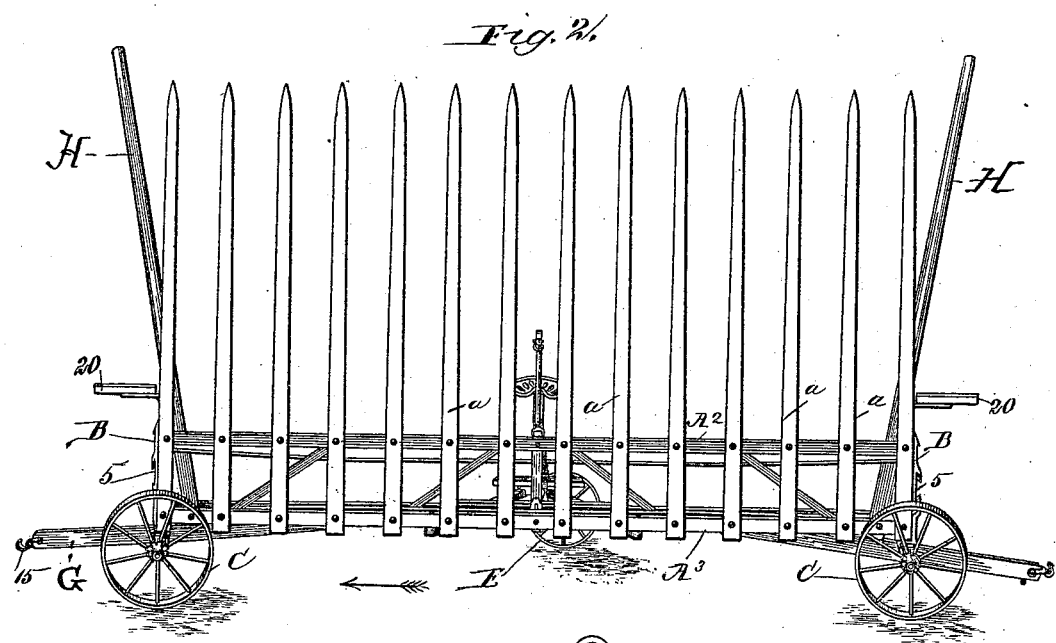
Figure 7:
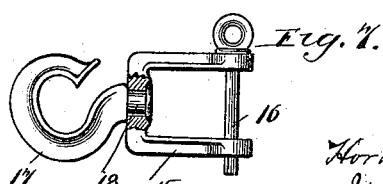

Figure 1 is a perspective view of a drag-rake embodying our invention. Fig. 2 is a view in front elevation, the gathering-teeth being shown as moved to an approximately vertical position. Fig. 3 is an enlarged view, in side elevation, of one end of the rake-head and attached parts and of the A-frame or rider's perch. Fig. 3$^a$ is an enlarged detail view of the upper portion of the bracket that rises from the center of the rake-head. Fig. 3$^b$ is an enlarged detail perspective view of a portion of one of the carrying-wheels, its journal, and the journal-plate. Fig. 4 is an enlarged detail perspective view of the metal head-block. Fig. 5 is an inside view of the metal head-block. Fig. 6 is an enlarged perspective view of one end of the rake-head, showing a modified construction of head-block. Fig. 7 is an enlarged detail view, partly in side elevation and partly in section, of the clevis for attachment to the end of the draft-bar. Fig. 8 is a detail view showing a slightly-modified embodiment of one feature of our invention.

A and A' designate the upper transverse bars of the rake-head, and A$^2$ and A$^3$ designate the lower transverse bars, to which latter bars are bolted in the usual manner the forwardly-projecting gathering-teeth $a$, that serve to collect the hay. The transverse bars A, A', A$^2$, and A$^3$ are connected at their ends to the metallic head-blocks B, and are preferably braced in well-known manner by truss-rods or the like.

The metallic head-blocks B are of cast metal, and are provided with the upwardly-extended arms $b$ and $b'$, upon which the ends of the transverse bars A and A' will rest, each of the arms $b$ and $b'$ being furnished with the inwardly-projecting flanges 2 and 3, to which the ends of the beams will be bolted. By preference also the head-block B will be provided with the rearwardly-projecting arm $b^2$, having a plate 4 to sustain the draft-bar G, that projects laterally from the end of the rake, the inner end of this draft-bar being suitably bolted to the main body of the rake-head, as seen in Fig. 1. So, also, the head-block B will be provided with a hole adapted to receive a bolt $h$, by means of which the projecting guide and backing pole H will be bolted to the head-block, the inner end of this guide-pole being fastened in usual manner to the transverse bar $A^2$ of the rake-head.

Heretofore it has been the practice to connect the transverse bars of a rake-head to wooden head-blocks; but with such head-blocks it was very difficult to give the desired strength to the rake-head, and it was necessary to brace these head-blocks to such extent as to considerably increase the cost of the structure. By our improved head-block, however, we are enabled to obtain a much stronger and far more durable construction of rake. This feature of our invention will be found applicable to the construction of drag-rakes generally whether the remaining parts of our invention be employed or not— that is to say, whether the rakes be provided with means whereby their teeth can be lifted into approximately vertical position, and whereby the rakes can be drawn endwise, in order to transport them from point to point.

In the preferred form of our invention each of the head-blocks B is preferably of cast metal, and is provided with a vertical dovetailed recess or socket 5 upon its outer face, this recess or socket serving to receive a journal-plate 6, from which projects the axle 7 of one of the carrying-wheels C, and by preference the dovetailed recess 5 and plate 6 will be narrower at the top, so that when the plate is in position for use the weight of the rake-head will serve to effectually hold the journal-plate in place without the necessity of other means of attachment.

In an arm $b^3$, that projects rearwardly from the head-block or casting B, is formed a dovetailed recess or socket 8, of a size and shape corresponding to the dovetailed socket 5 and serving to receive the journal-plate 6 when the teeth of the rake have been turned into vertical position and the carrying-wheels have been so shifted as to permit the endwise movement of the rake, as will hereinafter more fully be explained.

To the rear transverse beam $A^2$ of the rake-head is pivotally connected, as at $d$, the A-frame D, which is supported upon the caster-wheel E and is provided with the driver's seat $e$ in the usual manner. Upon this A-frame is sustained the shifting mechanism, whereby the position of the rake-teeth $a$ can be controlled by the driver without leaving his perch, this shifting mechanism being substantially the same as that set out in application, Serial No. 272,011, filed by H. A. Alden in the United States Patent Office April 27, 1888—that is to say, it comprises an operating-lever 10, pivoted at its lower end and connected, through the medium of a shifting-rod 11, with a bracket 12, that rises from the top of the transverse bars A and A', the movement of the operating-lever 10 serving to tilt the rake-head and to control the position of the rake-teeth $a$, as now well understood in the art. Instead, however, of having the shifting-rod 11 permanently attached to the top of the bracket 12, we connect this shifting-rod with the bracket in such manner that it can be readily detached therefrom when the rake-teeth are to be brought to the approximately vertical position seen in Fig. 2 of the drawings. In order to permit the ready detaching of the shifting-rod 11 from the bracket 12, we prefer to provide the upper part of this bracket 12 with an extension 30, having rearwardly-projecting arms, through which will pass the detachable bolt 31, that passes also through an eye at the end of the shifting-rod, and we prefer also to provide the top of the bracket 12 with an eye 14, adapted to be engaged by the hook 13 of the shifting-rod.

From the construction of parts as above defined it will be seen that when the rake is to be used for gathering hay the parts will occupy the relative positions seen in Fig. 1 of the drawings, the carrying-wheels C having their journal-plates 6 at such time within the dovetailed recesses or sockets 5 of the head-blocks B. When, however, it is desired to transport the rake through gates or along narrow roadways, through corn-fields, or the like, the end of the shifting-rod 11 will be detached from the bracket 12 and the rake-teeth $a$ will be turned to an approximately vertical position, and will be there retained by the engagement of the hook 13 with the eye of the bracket 12. The journal-plates 6 of the carrying-wheels C will next be removed from the recesses 5 of the head-blocks B and will be placed in the recesses 8 of these head-blocks, so that the plane of rotation of the wheels shall be in the direction of the length of the rake-head and substantially at right angles to the rake-teeth, as seen in Fig. 2 of the drawings. When the parts have been brought to this last-described position, they will be found capable of traveling within much narrower space than when in the position for use, (seen in Fig. 1 of the drawings,) and if a horse be attached to the clevis 15 at the end of a draft-bar G the rake can be drawn endwise in the direction of the arrow, Fig. 2, since at such time the caster-wheel will turn upon its vertical axis and rotate in the same direction as the carrying-wheels.

In order to permit the same clevis 15 to be used at the end of the draft-bar G, we prefer to pivotally connect this clevis 15 by a pin 16 so near to the end of a draft-bar that when the horse is moving in the direction of the rake-teeth the clevis will be in proper position for receiving the draft, and when the horse is to draw the rake endwise the clevis will swing to position, as seen in Fig. 2 of the drawings, and for like reason also we prefer to connect the hook 17 of the clevis by a swivel-joint 18 to the yoke, so that this hook will turn in proper manner to sustain the singletree when the horse is turned to draw the rake endwise.

In order to enable the driver to better manage the horse when driving the rake with the parts in the position shown in Fig. 2, we prefer to provide the rake-head with a driver's seat 20, that will be attached to the flanged projecting portion 21 of the head-block B by means of the bracket 22. This driver's seat, when the rake-teeth have been turned down into position for use, will extend in front of the carrying-wheel, as seen in Fig. 1, where it serves the purpose as a fender to keep the hay from interfering with the turning of the wheels.

It is obvious that the specified means hereinabove described for sustaining the rake-frame so that it can be moved either in forward or endwise direction may be varied within wide limits without departing from the spirit of our invention. Thus in Fig. 6 of the drawings one modified construction is illustrated. In this form of our invention the rake is provided with head-blocks B of cast metal, these head-blocks being formed with arms having at their ends suitable sockets or journal-bearings 40 and 41 to receive the inwardly-projecting end 42 of the journal 7 of the carrying-wheel. This head-block is also shown as provided with a dovetail socket or recess 5, in which a journal-plate similar to the journal-plate 6, hereinbefore described, and carrying the journal of one of the carrying-wheels, may be inserted, or, instead of employing a journal-plate such as before described the reduced portion of the journal 7 may be inserted through the hole or socket 50, formed in the head-block opposite the recess or socket 5, in order to sustain the journal.

When the head-block is provided with a hole 50 to receive the reduced portion of the journal 7, we prefer to provide the head-block with a bracket 60, bolted thereto adjacent the hole 50, this bracket being provided with a perforation 61 to sustain the rear end of the journal, as shown in Fig. 8 of the drawings.

Either one or both of the head-blocks may be made in accordance with the modified construction last described, and when this construction is adopted and the rake is to be turned into position to be drawn endwise the carrying-wheel will be removed from the journal 7 of the journal-plate 6 and will be placed upon the journal 7, that is sustained by the bearings 40 and 41.

Instead of employing journal-blocks with shifting-wheels at each end of the rake, we may employ at one end of the rake-head the form of journal-block illustrated in Figs. 3, 4, and 5 or the form of journal-block illustrated in Fig. 6, and adjacent the opposite end of the rake-head to the cross-bar $A^2$ we may attach a supplemental wheel W, so that when the rake-head is turned in such manner as to bring its teeth $a$ to an approximately vertical position the usual carrying-wheels will be lifted off the ground, and the weight of the rake will be sustained by the carrying-wheel in its changed position. When a supplemental wheel W is thus employed, we prefer that it should be a caster-wheel, the yoke of this wheel being sustained by a suitable journal-bracket $w'$, bolted to the transverse beam $A^2$ of the rake-head.

The use of a caster-wheel is advantageous in that it permits the rake to be turned in a much shorter space than would be possible if a wheel were used that had no swivel action.

Having thus described our invention, what we claim as new, and desire to secure by Letters Patent, is—

1. In a horse hay-rake, the combination of a broad rake-head having forwardly-projecting teeth adapted to be turned upward, for the purpose set forth, and suitable means for supporting said teeth in their upturned position, said rake-head being provided with wheels and with means for attaching said wheels thereto in a manner permitting the rake to be drawn forward and endwise, substantially as described.

2. In a horse hay-rake, the combination of a broad rake-head having forwardly-projecting teeth adapted to be turned upward, for the purpose set forth, and a suitable frame or support suitably connected with the rake-head to hold said teeth in their upturned position, said rake-head and said frame or support being provided with wheels and with means for attaching the wheels thereto in a manner permitting the rake to be drawn forward and endwise, substantially as described.

3. In a horse hay-rake, the combination of a broad rake-head provided with forwardly-projecting teeth adapted to be turned upward, for the purpose set forth, a frame at the rear of said rake-head and hinged thereto and provided with a wheel adapted to be shifted from its normal position to a position to rotate at right angles to the normal line of draft, and wheels attached to the rake-head and adapted to be shifted from their normal position to a position to rotate at substantially right angles to the normal line of draft, substantially as described.

4. In a horse hay-rake, the combination, with a broad rake-head, of a frame hinged to said rake-head to permit the rake-teeth to be turned upward, for the purpose set forth, said rake-head being supported on wheels in a plane parallel with the normal line of draft, and being provided with devices for the attachment of wheels to rotate in a plane substantially perpendicular or at right angles to the normal line of draft, substantially as described.

5. In a horse hay-rake, the combination, with a broad rake-head provided with forwardly-projecting teeth and with a frame at the rear of said rake-head provided with a wheel adapted to be shifted from its normal position to a position to rotate at substantially right angles to the normal line of draft, of a detachable shifting-rod connecting said rake-head and frame, whereby the rake-head is permitted to be turned to elevate its teeth, for the purpose set forth, and wheels for sustaining said rake-head, adapted to be shifted from their normal position to a position to rotate at substantially right angles to the normal line of draft, substantially as described.

6. In a horse hay-rake, the combination, with a broad rake-head having forwardly-projecting teeth and adapted to be turned to bring said teeth to an elevated position, for the purpose set forth, of detachable carrying-wheels and supports for said wheels, one set of such supports being arranged at the ends of the rake-head in front of the draft-bars and the other set of said supports being arranged at the rear of the rake-head, whereby when the wheels are held by one set of said supports the rake may be drawn forward and when held by the other set of said supports the rake may be drawn endwise, substantially as described.

7. In a horse hay-rake, the combination, with the broad rake-head having forwardly-projecting teeth adapted to be turned to an elevated position, for the purpose set forth, of carrying-wheels detachably connected thereto, detachable journals for said carrying-wheels, and suitable sockets wherein said journals will be sustained, one set of said sockets being located at each end of the rake-head and the other set of said sockets being located at the rear of said rake-head, whereby the carrying-wheels may be sustained to rotate in the plane of the normal line of draft or in a plane at right angles thereto, substantially as described.

8. In a horse hay-rake, the combination, with a broad rake-head having forwardly-projecting teeth and adapted to be turned to bring said teeth to an elevated position, for the purpose set forth, of suitable means for sustaining said rake-head with its teeth in their upturned position, suitable carrying-wheels attached to the rake-head, journals for said wheels, plates to which said journals are attached, and head-blocks provided each with two sockets adapted to receive said journal-plates, whereby said carrying-wheels may be arranged to rotate in the plane of the normal line of draft or at substantially right angles thereto, substantially as described.

9. In a horse hay-rake, the combination of a broad rake-head having forwardly-projecting teeth, the seat-frame pivotally connected to said rake-head in a manner permitting said rake-head to be turned to bring its teeth to an elevated position, for the purpose set forth, a detachable shifting-rod connecting said rake-head and seat-frame, a suitable catch for holding said rake-head when its teeth are turned upward, suitable wheels for said rake-head and seat-frame, and suitable means for attaching said wheels to the rake-head and seat-frame in a manner permitting the wheels to rotate at substantially right angles to the normal line of draft, substantially as described.

10. In a horse hay-rake, the combination, with the rake-head and a seat-frame pivotally connected thereto, of a bracket 12, mounted upon said rake-head and provided with an eye 14, and a shifting-rod 11, detachably connected to said bracket 12 and provided with a hook 13, substantially as described.

11. In a horse hay-rake, the combination, with the rake-head, of head-blocks each provided with double sets of sockets arranged at an angle to each other, suitable carrying-wheels, and journals and journal-plates for said carrying-wheels adapted to enter the sockets of the head-blocks, one set of said sockets being arranged to receive the journal-plates in manner permitting the carrying-wheels to be drawn in forward direction and the other set of said sockets being arranged to hold the journal-plates in manner permitting the carrying-wheels to be drawn in the direction of the length of the rake-head, with the rake-teeth in elevated position, substantially as described.

HORACE A. ALDEN.
JOHN E. KIRK.

Witnesses:
W. W. HAMMOND,
C. GEATHARD.